No. 671,889. Patented Apr. 9, 1901.
J. A. JOHNSON.
ADJUSTABLE RUBBER TIRE SETTER.
(Application filed May 26, 1900)
(No Model.)
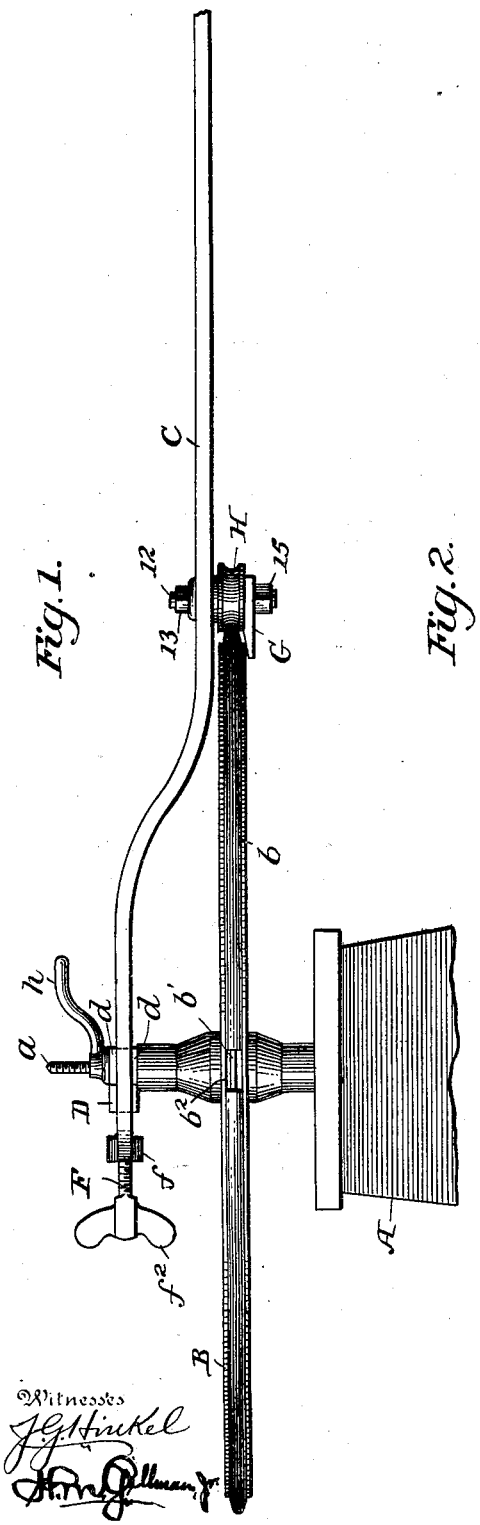
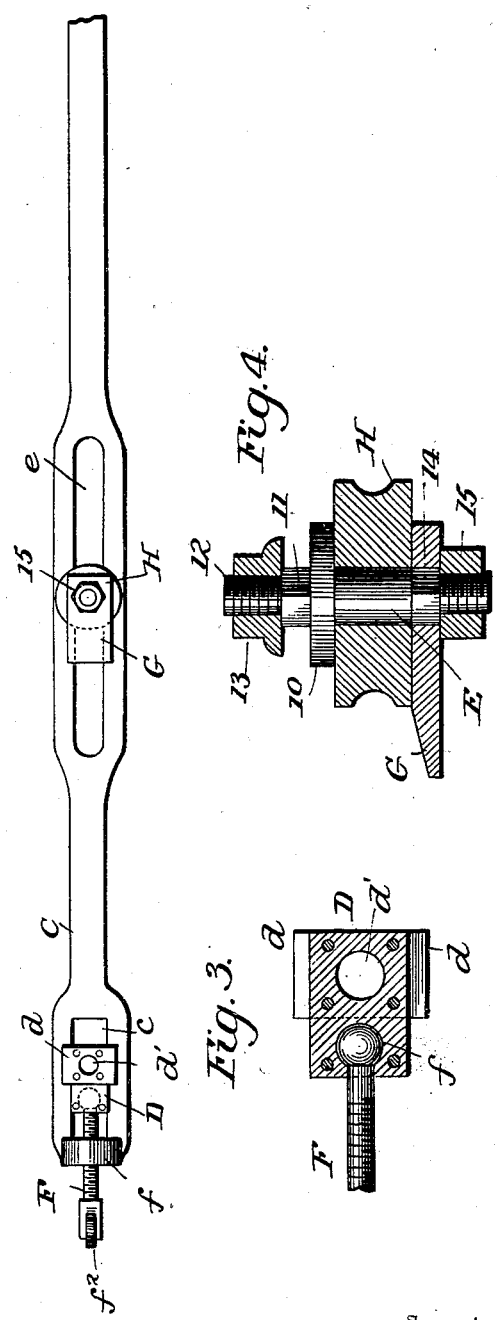
Witnesses
Inventor
John A. Johnson

UNITED STATES PATENT OFFICE.

JOHN A. JOHNSON, OF BARNESVILLE, GEORGIA, ASSIGNOR OF ONE-HALF TO JAMES P. THURMAN, OF SAME PLACE.

ADJUSTABLE RUBBER-TIRE SETTER.

SPECIFICATION forming part of Letters Patent No. 671,889, dated April 9, 1901.

Application filed May 26, 1900. Serial No. 18,126. (No model.)

*To all whom it may concern:*

Be it known that I, JOHN A. JOHNSON, a citizen of the United States, and a resident of Barnesville, in the county of Pike and State of Georgia, have invented a certain new and useful Improvement in Adjustable Rubber-Tire Setters, of which the following is a specification.

The invention relates to tire-setters intended for use in bringing the ends of a rubber tire together after the ends of the metal band embedded in the rubber tire have been secured together. The usual method of securing tires of this character in the channel of the felly is to crowd the rubber back from the ends of the metal band, then place the tire in the channel and with suitable clamps draw the ends of the metal band toward each other, causing them to overlap until the metal band is drawn tight around the wheel, and the two ends of the band are then secured together by riveting or otherwise. The clamps are then removed and a portion of the metal band is left exposed, and it is necessary to work the rubber tire over the metal band to bring the two ends of the rubber tire together and cover the exposed portion of the band. This working of the tire over the band is usually effected by striking the rubber tire glancing blows with a mallet on each side of the joint. This method is objectionable in many ways, among others being the liability of injuring the tire and of unduly stretching it at some portions, while other portions may be compressed.

The object of my invention is to provide an apparatus by which the rubber tire may be moved over the band by applying a rolling pressure to the tire in opposite directions on each side of the joint, so that the rubber tire will be moved uniformly on each side of the joint to bring its ends together and the tire will not be injured in any manner.

The invention will be fully described hereinafter, reference being had to the accompanying drawings, in which—

Figure 1 is an elevation of my improved tire-setter in position to act on a rubber tire. Fig. 2 is a bottom plan view of the tire-setter. Fig. 3 is a sectional view of the sliding pivot-block detached, and Fig. 4 a sectional view of the pressure-roller and guide detached.

A indicates a wheel-horse having a vertical standard $a$, preferably threaded at its upper portion.

B indicates a wheel, and $b$ a rubber tire thereon, a space $b'$ being shown between the ends of the tire such as exists after the ends of the metal band $b^2$ have been secured together and the clamps removed, as heretofore indicated. The hub of the wheel fits over the standard $a$, and any suitable means may be employed to prevent the wheel from turning on the standard.

The tire-setter consists, essentially, of a lever C, having an adjustable sliding pivot-block D at one end, and a pin E slidably mounted in the lever and carrying a pressure-roller H and guide G. The inner ends of the lever is slotted, as indicated at $c$, to receive the block D, and the latter is provided with lips $d$ to engage the upper and lower faces of the lever C on each side of the slot. The block D is provided with an opening $d'$ to receive the standard $a$, which latter serves as a pivot about which the lever swings. The inner end of the lever C is provided with a boss $f$, having a threaded opening through which a threaded rod F passes, and is swiveled to the block D, preferably by a ball-and-socket joint, as indicated at $f'$. The rod F is provided with a handle $f^2$.

Intermediate its ends the lever C is provided with another slot $e$, through which the pin E extends. The pin E has an annular flange 10, adapted to engage the lower face of the lever C, a squared portion 11 to fit in the slot $e$, and a threaded upper end 12 to receive a clamping-nut 13, which engages the upper face of the lever C. The pin E can thus be adjusted lengthwise of the slot $e$ and clamped in any desired position, but cannot turn in the slot. Below the flange 10 the pin E is cylindrical and forms a journal for the pressure-roller H, and below the roller is an angular portion 14, on which the guide G is fitted and which is held in position by a nut 15 on the lower threaded end of the pin.

When the tire-setter is to be used, the pivot-block D is fitted on the standard $a$ and supported upon the end of the wheel-hub, or there may obviously be a washer-plate between them. As shown, the lever C is bent in ogee form to bring the pressure-roller H in the same horizontal plane as the tire. The roller H may be caused to engage the tire by adjusting the pin E in the slot e, and when so engaged the guide G will engage the under face of the felly. The hand-screw h will be tightened on the block D sufficiently to prevent undue wabbling of the lever and yet permit the block D to turn on the standard a. If now the screw F be operated, any desired degree of pressure may be established between the roller H and the rubber tire, and then by moving the lever toward the joint to be formed by the ends of the tire the roller will roll over the tire and at the same time have a more or less dragging action thereon, depending upon the degree of pressure, and this dragging action will cause the rubber tire to move over the metal band, and such movement may obviously be regulated by regulating the pressure between the roller H and the tire by the adjusting-screw F. The rubber tire may thus be worked evenly over the metal band to close the space b', and the roller H will not injure it in any manner.

Without limiting myself to the precise details of construction illustrated and described, I claim—

1. In an apparatus for moving the separated ends of a rubber tire toward each other over an embedded metal band, after said tire has been fitted in the channeled felly of the wheel, the combination of a lever having a slot at one end, a block slidably mounted in said slot and provided with an opening to receive a pivot-pin extending through the hub of the wheel, a threaded adjusting-rod supported in a threaded opening in the end of the lever and having a swivel connection with the sliding block, a pin slidably mounted on the lever intermediate the ends of the latter, means to clamp the pin to the lever, and a roller and guide carried by said pin and adapted respectively to engage the outer periphery of the tire and one side of the felly, substantially as and for the purpose set forth.

2. In an apparatus for moving the separated ends of a rubber tire toward each other over an embedded metal band after said tire has been fitted in the channeled felly of a wheel, the combination with a wheel-horse provided with a standard a, the latter being adapted to extend through the hub of a wheel supported on the horse, of a lever C provided with a slot c at the inner end and a slot e intermediate its ends, a pivot-block D slidingly supported in the slot c and adapted to be supported on the end of a wheel-hub and having an opening through which the standard a extends, an adjusting-screw mounted in the end of the lever and having a swivel connection to the pivot-block, a pin slidingly supported in the slot e, means to clamp said pin to the lever, and a roller and a guide mounted on said pin below the lever, and adapted to engage the outer periphery of the tire and one side of the felly of a wheel respectively, and said lever being bent to bring the roller and guide in a horizontal plane different to that of the pivot-block, substantially as set forth.

In testimony whereof I have signed my name to this specification in the presence of two subscribing witnesses.

JOHN A. JOHNSON.

Witnesses:
J. D. HIGHTOWER,
LUTHER BRAZIER.